United States Patent
Routhier

(10) Patent No.: US 9,501,815 B2
(45) Date of Patent: Nov. 22, 2016

(54) PROCESSING PANORAMIC PICTURES

(71) Applicant: THOMSON LICENSING, Issy de Moulineaux (FR)

(72) Inventor: Pierre Hughes Routhier, Los Angeles, CA (US)

(73) Assignee: THOMSON LICENSING, Issy de Moulineaux (FR)

( * ) Notice: Subject to any disclaimer, the term of this patent is extended or adjusted under 35 U.S.C. 154(b) by 90 days.

(21) Appl. No.: 14/401,595

(22) PCT Filed: May 17, 2013

(86) PCT No.: PCT/US2013/041491
§ 371 (c)(1),
(2) Date: Nov. 17, 2014

(87) PCT Pub. No.: WO2013/173670
PCT Pub. Date: Nov. 21, 2013

(65) Prior Publication Data
US 2015/0178898 A1    Jun. 25, 2015

Related U.S. Application Data

(60) Provisional application No. 61/688,658, filed on May 18, 2012.

(51) Int. Cl.
*G06T 5/00* (2006.01)
*G06T 13/80* (2011.01)

(52) U.S. Cl.
CPC .............. *G06T 5/002* (2013.01); *G06T 13/80* (2013.01); *G06T 2207/20201* (2013.01); *G06T 2210/22* (2013.01)

(58) Field of Classification Search
None
See application file for complete search history.

(56) References Cited

U.S. PATENT DOCUMENTS 5,659,323 A * 8/1997 Taylor ................. G03B 19/026
                                                       348/159
5,809,219 A    9/1998 Pearce et al.
(Continued)

FOREIGN PATENT DOCUMENTS

JP     2009027437     2/2009
WO   WO2004112290    12/2004

OTHER PUBLICATIONS

Ariki et al, "Automatic Production System of Soccer Sports Video by Digital Camera Work Based on Situation Recognition," Proceedings of the Eighth IEEE International Symposium on Multimedia (ISM 2006), Dec. 11-13, 2006, San Diego, CA, IEEE Computer Society, Los Alamitos, CA, Dec. 1, 2006, pp. 851-860.

(Continued)

*Primary Examiner* — Maurice L McDowell, Jr.
(74) *Attorney, Agent, or Firm* — Tutunjian & Bitetto, P.C.

(57) ABSTRACT

Various implementations relate to processing pictures. In one particular implementation, a cropped picture is accessed. The cropped picture has been cropped, using a virtual camera window, from a picture in a sequence of pictures. Motion blur is generated for a feature in the cropped picture based on a motion of the virtual camera window and a motion of the feature. The generated motion blur is added to the feature in the cropped picture. In another particular implementation, a signal or signal structure includes a picture section for a cropped picture that has been cropped, using a virtual camera window, from a picture in a sequence of pictures. The signal or signal structure also includes a motion section for an indication of a motion of the virtual camera window.

22 Claims, 7 Drawing Sheets

(56) References Cited

U.S. PATENT DOCUMENTS

| 7,015,954 | B1 | 3/2006 | Foote et al. |
| 7,710,461 | B2 | 5/2010 | Nagano et al. |
| 2009/0017907 | A1 | 1/2009 | Shimizu et al. |
| 2010/0026827 | A1 | 2/2010 | Kobayashi et al. |
| 2011/0254973 | A1* | 10/2011 | Nishiyama .............. G06T 13/80 348/222.1 |

OTHER PUBLICATIONS

Foote et al., "Region of Interest Extraction and Virtual Camera Control Based on Panoramic Video Capturing", IEEE Transactions on Multimedia, vol. 7, No. 5, Oct. 1, 2005, pp. 981-990.

Liu et al., "Video Retargeting: Automating Pan and Scan," Proceedings of ACM Multimedia 2006 & Co-Located Workshops, Santa Barbara, CA, USA, ACM Press, Oct. 23, 2006, pp. 241-250.

Patel et al., "Combining Motion Blur and Stereo", Proceedings of SPIE, vol. 1669, Jan. 1, 1992, pp. 71-82.

Schoberl et al., "Modeling of Image Shutters and Motion Blur in Analog and Digital Camera Systems", 2009 16th IEEE International Conference on Image Processing (ICIP 2009), Nov. 7, 2009, pp. 3457-3460.

Kaiser et al., "Automatic Camera Selection for Format Agnostic Live Event Broadcast Production" Forum Medientechnik pp. 1-8, 2012.

Alface et al., "Interactive Omnidirectional Video Delivery: A Bandwidth-Effective Approach", Bell Labs Technical Journal 16(4), 2012, pp. 135-148.

International Search Report Dated Jan. 3, 2014.

* cited by examiner

PROCESSING PANORAMIC PICTURES

CROSS REFERENCE TO RELATED APPLICATIONS

This application claims the benefit, under 35 U.S.C. §365 of International Application PCT/US13/41491, filed May 17, 2013, which was published in accordance with PCT Article 21(2) on Nov. 21, 2013 in English and which claims the benefit of United States provisional patent application No. 61/688,658, filed May 18, 2012.

TECHNICAL FIELD

Implementations are described that relate to digital pictures. Various particular implementations relate to processing panoramic digital pictures.

BACKGROUND

It is frequently desirable to extract a portion of a panoramic digital picture. However, the resulting picture often has poor viewing quality.

SUMMARY

According to a general aspect, a cropped picture is accessed. The cropped picture has been cropped, using a virtual camera window, from a picture in a sequence of pictures. Motion blur is generated for a feature in the cropped picture based on a motion of the virtual camera window and a motion of the feature. The generated motion blur is added to the feature in the cropped picture.

According to another general aspect, a signal or signal structure includes a picture section for a cropped picture that has been cropped, using a virtual camera window, from a picture in a sequence of pictures. The signal or signal structure also includes a motion section for an indication of a motion of the virtual camera window.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
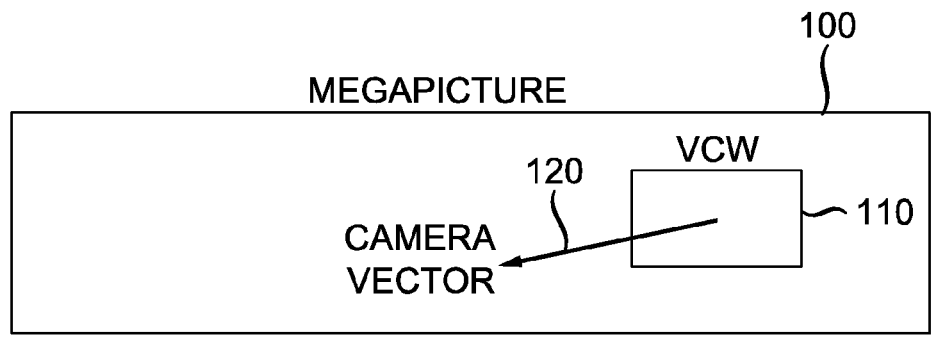
FIG. 1 provides a pictorial diagram depicting an example of a virtual camera window overlaying a panoramic picture (megapicture) and having a motion indicated by a camera vector.

At least one implementation described in this application is directed towards a method to create realistic pan and scanned virtual images from panoramic, fixed position image capture devices. One such implementation determines the motion of a window that is used in the pan and scan process, and separately determines the motion of features in the window.

In order to make the viewing of a large scale event (like sports played over a wide field, for example) more personalized, or to reduce the number of cameras required to cover the event, several implementations use either (i) a single, very wide angle, super high resolution camera, or (ii) camera arrays that cover the very wide angle view. The output image from the single camera is a very high resolution image. Or the outputs from the camera array are stitched together to put the ultra-wide view into a single, very high resolution image. The single very high resolution image, whether from a single camera or stitched together from a camera array, is referred to here as a megapicture or a panoramic picture.

Following the creation of this megapicture, pan and scan operations are performed, to emulate the view which would be obtained if an actual camera was performing image framing and zooming on site.

Note that the single camera, or the camera array, is, in various implementations, stationary. That is, the one or more cameras do not move in any direction. For example, the one or more cameras do not move translationally or rotationally. Motion can be determined with respect to this stationary reference point, or view point. For example, to determine a feature's motion between adjacent pictures, the feature's location in each picture can be taken with respect to a common (global) coordinate system. This is in contrast, for example, to determining a feature's location based on its coordinates within the VCWs of each of the adjacent pictures.

It is advantageous to compensate for the fact that unlike physical cameras, the megapicture is created from a stationary position, with moving objects, which creates motion blur in the moving objects (the athletes, for example). A physical camera would track the subject (the athlete), and therefore to the camera it would be the background that is blurry. Because people are used to viewing fast moving images with a clear subject and a blurry background, not the other way around, uncompensated solutions are not typically compatible with high quality viewing.

In at least one implementation, a very high shutter speed imaging system (or multiple very high shutter speed systems for a stitched megapicture) creates the source content, with no motion blur at all. A stitched megapicture is created by tiling or arranging the pictures from multiple cameras that typically take pictures at the same instant of time. This source content would typically be painful to watch in its native form, because the absence of motion blur typically creates a very perceivable strobing effect to the human eye.

Following creation of the source content, the desired, simulated camera motion is inputted by the user, creating a Virtual Camera Window (VCW) with scaling and cropping characteristics (from the megapicture), as well as a directional vector.

This is shown in FIG. 1, in which a panoramic picture 100 includes a VCW 110 having a camera vector 120.

The camera motion is input, in different implementations, in various ways. For example, (i) a user can stipulate a direction, (ii) a user can identify an object or other feature to be tracked and the direction can be adaptively updated based on the tracking, or (iii) an object or other feature can automatically be selected and tracked. In one particular implementation, a soccer ball is automatically selected as the object to track for a soccer game. The user is, in different implementations, and merely as examples, an operator creating the content for broadcast, or an end-user viewing the content at the end-user's home on the end-user's television ("TV").

Figure 2:
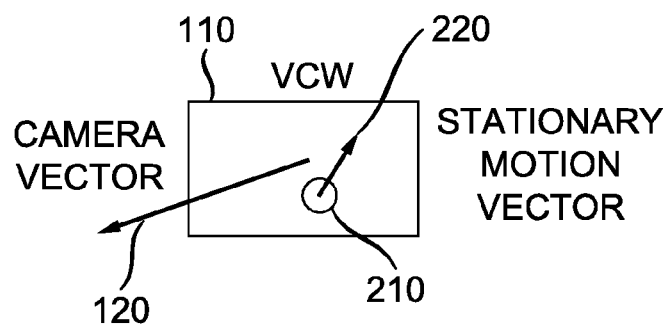
FIG. 2 provides a pictorial diagram depicting an example of the virtual camera window of FIG. 1 having an object in the virtual camera window, and the object having a motion indicated by a stationary motion vector.

For any feature within the VCW, two motion vectors are typically present. One vector is the Camera Vector, which is given, for example, by user input (as explained above for several examples). The other vector is the Stationary Motion Vector, which is given by motion analysis on the static source. FIG. 2 illustrates these two vectors for an object.

FIG. 2 shows the VCW 110 having the camera vector 120. FIG. 2 also shows an object 210 in the VCW 110. The object 210 has a stationary motion vector 220. The stationary motion vector 220 can be determined, for example, by comparing the position of the object 210 in the megapicture 100 with the position of the object 210 in a previous (in time) megapicture. The stationary motion vector 220 does not consider the motion of the VCW 110.

Figure 3:
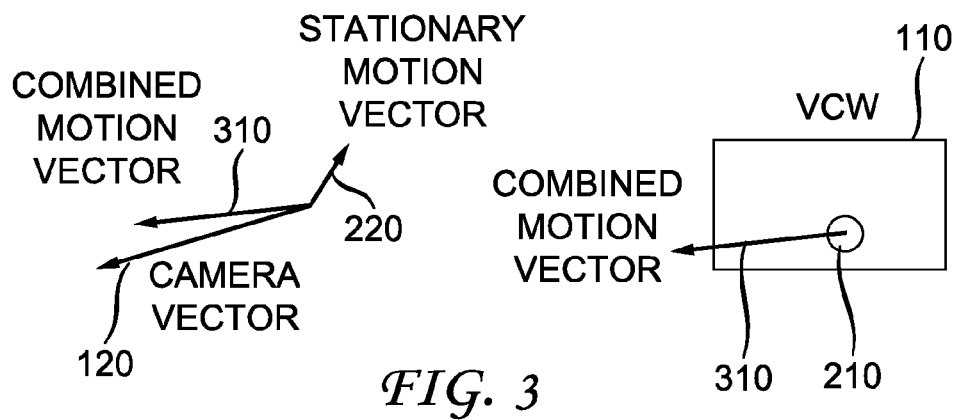
FIG. 3 provides a pictorial diagram depicting an example of a vector addition of the vectors of FIG. 2, and showing the resultant vector being associated with the object in the virtual camera window.

The Combined Motion Vector for any feature in the image is given by adding both the Camera Vector and the Stationary Motion Vector. The Combined Motion Vector provides the direction and intensity that should be applied when making motion blur calculations for this feature within the VCW. FIG. 3 illustrates a combined motion vector.

FIG. 3 shows the vector addition of the camera vector 120 and the stationary motion vector 220 to produce a combined motion vector 310. FIG. 3 also shows the combined motion vector 310 being associated with the object 210 in the VCW 110.

In the case where the processing power is limited, or to make viewing more comfortable, it is also possible to add speed limitations and speed change buffers on the camera vector to prevent the camera motion from exceeding the motion blur computation capabilities or comfort levels.

Having obtained a VCW and a combined vector for one or more features, motion blur can be calculated (as is known in the art) and added (as is known in the art) to those features in the VCW. The final image can be calculated in various ways.

One implementation is often suitable if speed is the dominant factor (for applications where, for instance, real time or near real time applications are considered). In such cases, the virtual camera image is first cropped to the VCW, then scaled to the destination device's resolution. After the scaling, the calculations and application of motion blur are applied. The computations associated with motion blur are typically intensive and will typically be performed faster in the destination resolution.

Another implementation is often suitable if quality is the dominant factor (for non-real time applications like cinema capture, for example). In such cases, the motion blur is applied on the VCW first, so the motion blurring algorithms can benefit from the highest possible resolution. Subsequently, the image is resized (scaled) to meet the destination resolution.

In this application, "cropping" refers generally to selecting a limited portion of a larger picture for display. The selected portion (rather than the unselected portion) is typically referred to as the cropped picture. After cropping, the cropped picture (that is, the selected portion) will typically be converted using a scaling operation, so that the cropped portion has a different resolution and a different aspect ratio, based on the resolution of the display device. Cropping, as used in this application, typically is considered to be separate from the scaling operation, although certain implementations may use "cropping" to refer to the combination of the selecting and scaling operations.

Figure 4:
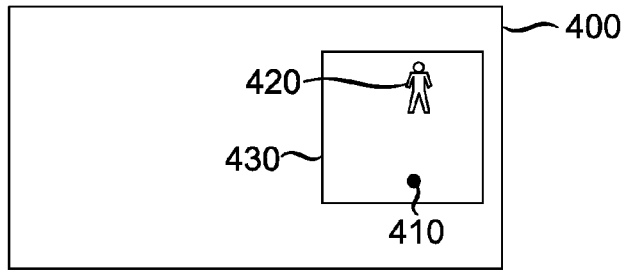
FIG. 4 provides a pictorial diagram depicting an example of a virtual camera window encompassing particular features in a first panoramic picture.

We now describe another implementation with reference to FIGS. 4-9. Referring to FIG. 4, a panoramic picture 400 is shown for a particular point in time. The picture 400 includes a ball 410 and a player 420. Both the ball 410 and the player 420 are included in a VCW 430.

Figure 5:
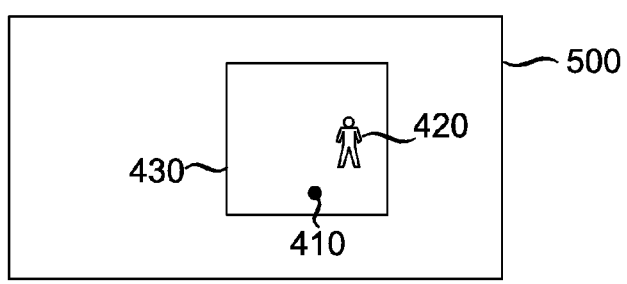
FIG. 5 provides a pictorial diagram depicting an example of the virtual camera window of FIG. 4 in a new position in a second panoramic picture to encompass the particular features.

FIG. 5 shows a panoramic picture 500 taken a short time after the panoramic picture 400 was taken. The picture 500 includes the ball 410 and the player 420 in different positions. Additionally, the VCW 430 is also shown in a different position, as compared to FIG. 4, so that the VCW 430 still includes both the ball 410 and the player 420.

In this implementation, the VCW 430 is adjusted so that the ball 410 is approximately centered, in the horizontal direction, in the VCW 430. Other implementations attempt, for example, (i) to place the ball 410 in the center both vertically and horizontally, or (ii) to determine a center of gravity (also referred to as a center of mass) of the set of objects of interest, which are, for example, the ball 410 and the player 420, and to put that center of gravity in the center of the VCW 430 both vertically and horizontally.

Figure 6:
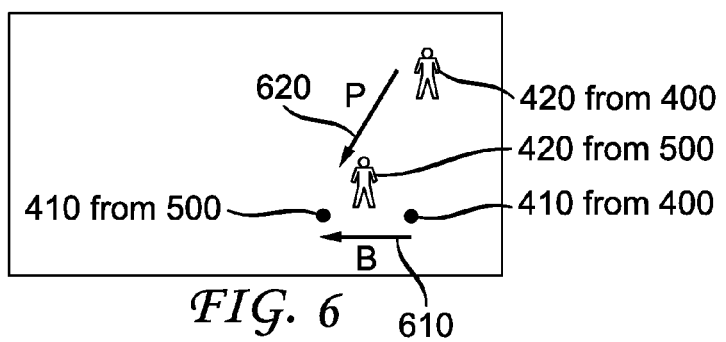
FIG. 6 provides a pictorial diagram depicting an example of a panoramic picture that includes the particular features from both FIGS. 4 and 5, and illustrates vectors showing the motion of the particular features.

FIG. 6 shows a superposition of the ball 410 and the player 420 from both the picture 400 and the picture 500. This is a useful construct to illustrate the motion of the ball 410 and the player 420. FIG. 6 also includes a ball vector 610 (also labeled with a "B") showing the motion of the ball 410 from the picture 400 to the picture 500. FIG. 6 further includes a player vector 620 (also labeled with a "P") showing the motion of the player 420 from the picture 400 to the picture 500.

Figure 7:
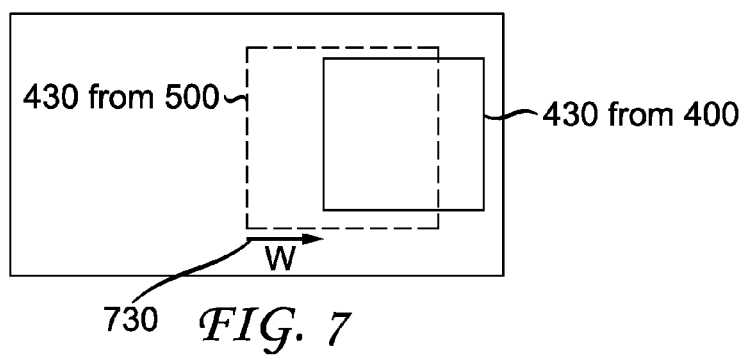
FIG. 7 provides a pictorial diagram depicting an example of a panoramic picture that includes the virtual camera windows from both FIGS. 4 and 5, and illustrates a vector showing the motion of the virtual camera window.

FIG. 7 is analogous to FIG. 6, and shows a superposition of the VCW 430 from both the picture 400 and the picture 500. This is a useful construct to illustrate the motion of the VCW 430. FIG. 7 also includes a VCW vector 730 (also labeled with a "W") showing the motion of the VCW 430 from the picture 400 to the picture 500. The VCW vector 730 has a direction opposite that of the ball vector 610 and the player vector 620 because the VCW vector 730 can be considered to capture the motion for features that is attributable to the camera motion.

Figure 8:
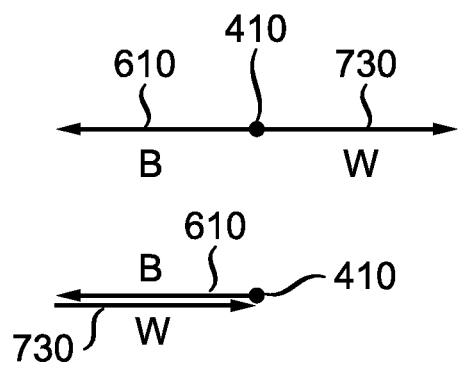
FIG. 8 provides a pictorial diagram depicting an example of vector addition showing the resultant motion to be used in determining motion blur for a ball of FIG. 5.

FIG. 8 shows a vector addition to generate a combined motion vector for the ball 410. FIG. 8 includes the ball 410, the ball vector 610, and the VCW vector 730, with both of the vectors 610 and 730 having the appropriate direction and magnitude. In the top portion of FIG. 8, the ball vector 610 and the VCW vector 730 are both emanating from the ball 410 showing the separate motions of these vectors. In a bottom portion of FIG. 8, the ball vector 610 emanates from the ball 410, but the VCW vector 730 emanates from the terminal end of the ball vector 610, to illustrate the addition of the two vectors 610 and 730. The result of the vector addition is a zero vector having no magnitude and no direction. This result is due to the fact that the VCW 430 in this implementation is tracking the ball 410 perfectly from FIG. 4 to FIG. 5. The correctness of this result can be seen by the fact that the ball 410 appears in the same relative position in the VCW 430 of both FIG. 4 and FIG. 5. The resulting zero vector is the resultant motion to be used in determining motion blur for the ball 410 of FIG. 5.

Figure 9:
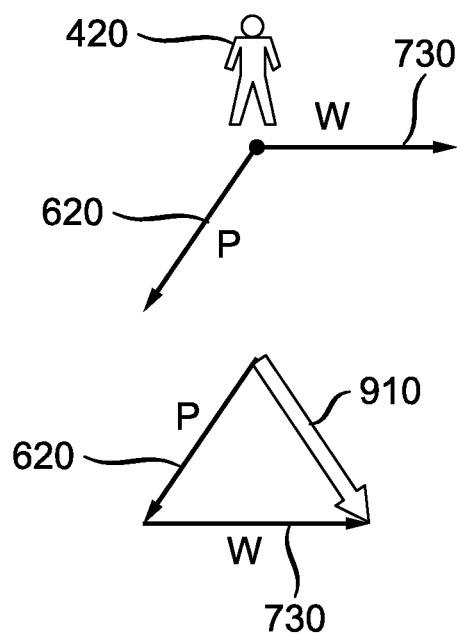
FIG. 9 provides a pictorial diagram depicting an example of vector addition showing the resultant motion to be used in determining motion blur for a player of FIG. 5.

FIG. 9 shows a vector addition to generate a combined motion vector for the player 420. FIG. 9 includes the player 420, the player vector 620, and the VCW vector 730, with both of the vectors 620 and 730 having the appropriate direction and magnitude. In the top portion of FIG. 9, the player vector 620 and the VCW vector 730 are both emanating from the player 420 showing the separate motions of these vectors. In a bottom portion of FIG. 9, the player vector 620 emanates from the player 420, but the VCW vector 730 emanates from the terminal end of the player vector 620, to illustrate the addition of the two vectors 620 and 730. The result of the vector addition is a combined player vector 910 having a magnitude and a direction as shown in FIG. 9. This result is due to the fact that the VCW 430 in this implementation is tracking the ball 410, and not the player 420. Accordingly, the player 420 appears in a different relative position in FIG. 4 and FIG. 5. The combined player vector 910 is the resultant motion to be used in determining motion blur for the player 420 of FIG. 5.

Figure 10:
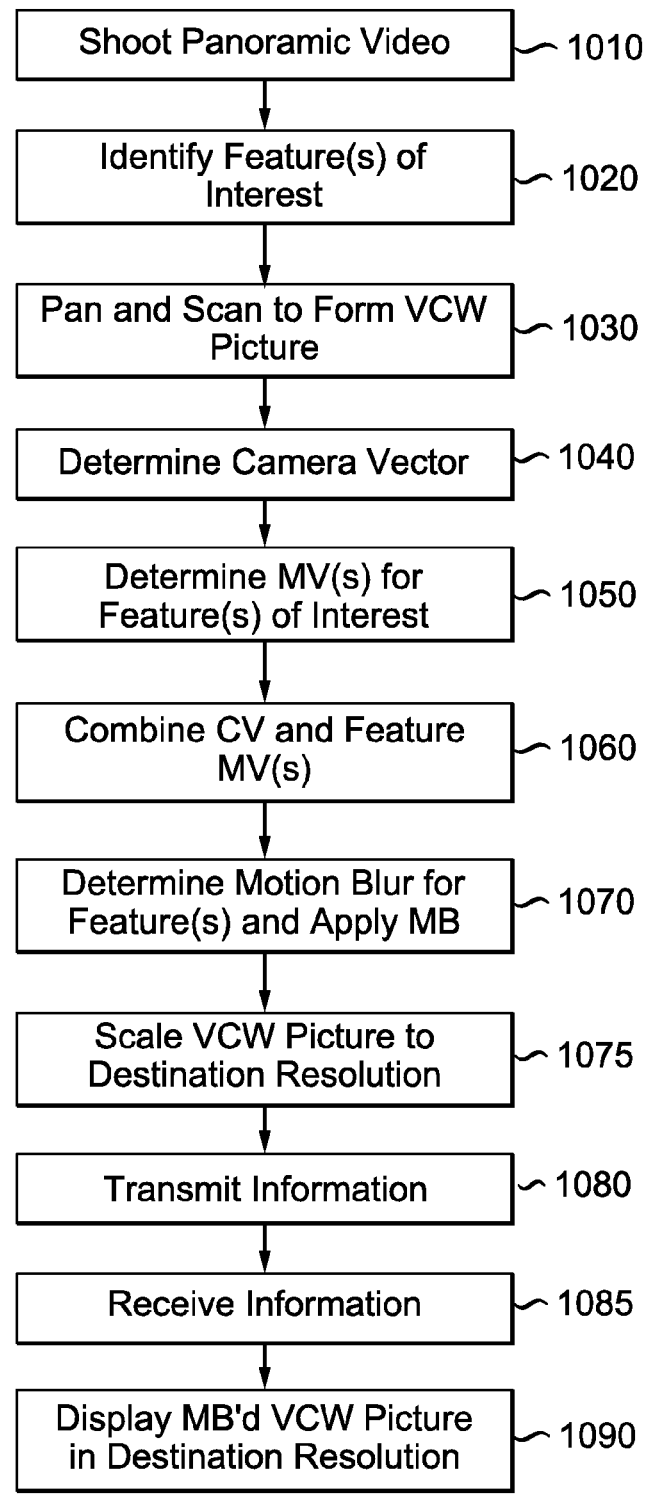
FIG. 10 provides a flow diagram depicting an example of a process for applying motion blur.

Referring to FIG. 10, a flow diagram is provided. The flow diagram depicts a process 1000 that provides an example of a process for applying motion blur.

The process 1000 includes shooting a panoramic video that includes multiple panoramic pictures (1010). In various implementations, the panoramic video is captured using a single camera or using multiple cameras. When multiple cameras are used, the output from the cameras is stitched or tiled together to form a single panoramic video.

The process 1000 includes identifying one or more features of interest (1020). In various implementations, one or more feature(s) of interest are identified automatically by selecting an object or a face. In one such example, a soccer ball is automatically selected as a feature of interest in a soccer game that is being captured on video. In various implementations, one or more feature(s) of interest are selected based on human input, such as, for example, by being selected by an operator or by an end-user.

Selection by an operator or a user includes, in various implementations, selecting from a set of available features, or from a set of available VCWs. In such implementations, the system typically receives the input and then provides an appropriate output video sequence in response to the selection. In one such implementation, a user is able to view different aspects of a soccer game by selecting different pre-programmed VCWs.

In various implementations, different VCWs are prepared to track different features. However, different features can have different frequencies of appearance, and so the respective VCWs are not always available. Some features of interest (for example, a soccer ball in a soccer game) are in the vast majority of pictures in the video. Other features of interest (for example, a secondary character in a movie) are in a significant portion (but not a vast majority) of the pictures in the video. Other features of interest (for example, a cameo appearance in a movie by a famous actor) are only in a relatively small portion of the pictures in the video.

In various implementations, the feature(s) of interest are determined once for the entire video. For example, in certain implementations that capture a soccer game, the feature of interest is determined to be the soccer ball. In other implementations, the feature(s) of interest is changed, or at least updated, as the video progresses. For example, in one implementation, any character that is speaking is determined to be a feature of interest for the duration of the shot in which the character is speaking.

The process 1000 includes performing a pan and scan to form a VCW picture (1030). In typical implementations, the formed VCW will include all of the features of interest, and the VCW will be used to perform the cropping of multiple pictures in the panoramic video. Those multiple pictures are, for example, all pictures in the video, all pictures in a scene, or all pictures in a shot (a shot is, for example, all consecutive pictures in the video taken from the same camera). The pan and scan operation generally results in a selecting a limited portion of each panoramic picture, and is referred to as cropping.

The process 1000 includes determining a camera vector (1040). The camera vector captures the motion of the virtual camera, which is the same as capturing the motion of the VCW. The camera vector of the implementation of FIGS. 4-9 is, therefore, the same the VCW vector 730. In various implementations, the camera vector is determined by looking back one picture, as illustrated in FIGS. 4-9. In other implementations, the camera vector is determined by looking forward in time, in addition to or in lieu of looking backwards in time. Further, in various implementations, the camera vector is determined by looking more than one picture forward or backward, and/or by filtering the indicated motion. Such implementations are often useful when a fast-moving object such as a ball is being tracked automatically. Using an average across multiple pictures can serve to keep the camera vector from changing too drastically. Drastic movements of the camera may be uncomfortable for viewers to watch.

The process 1000 includes determining a motion vector for one or more features of interest (1050). In various implementations the motion is determined with respect to the panoramic pictures, as explained, for example, in FIGS. 4-9. In various implementations, an optical flow algorithm is used to determine the motion of one or more features, as is well known.

The process 1000 includes combining the camera vector and the feature motion vector(s) (1060). In typical implementations, as explained, for example, in FIGS. 4-9, a separate combined vector is determined for each feature of interest (for example, the combined player vector 910), and each feature uses the camera vector (referred to as the VCW vector 730 in FIGS. 7-9).

The process 1000 includes determining the motion blur for the feature(s) of interest and applying the motion blur (1070). The motion blur for a given feature of interest is determined based on the combined vector for that feature, which is determined in the operation 1060. In various implementations, motion blur is determined for all portions of the picture, whereas in other implementations motion is determined for only selected features.

The process 1000 includes scaling the picture in the VCW to a destination resolution (1075). In the ordering of operations in the process 1000, scaling the picture in the VCW (1075) involves scaling the picture in the VCW after the motion blur is applied to one or more features of interest (1070). Other orderings of the operations are envisioned, however, and various implementations are discussed elsewhere in this application.

The process 1000 includes transmitting information (1080). In various implementations, the information that is transmitted includes one or more of (i) the panoramic picture, (ii) the VCW picture, (iii) the scaled VCW picture, (iv) the camera vector, (v) a scaled camera vector, (vi) a feature motion vector, (vii) a scaled feature motion vector, (viii) a combined vector, (ix) a scaled combined vector, (x) a VCW picture with motion blur applied, and/or (xi) a scaled VCW picture with motion blur applied. The transmitter is, in various implementations, for example, a broadcast truck and/or a hub for a cable distribution network. In one implementation, a broadcast truck transmits information to a cable distribution head-end, and the cable-distribution head-end transmits information to a hub, and the hub transmits information to a number of homes (for example, 20-25 homes).

The process 1000 includes receiving information (1085). The information that is received is, in various implementations, for example, any of the information that is transmitted in the operation 1080.

The process 1000 includes displaying the motion-blurred VCW picture (that is, the VCW picture with the motion blur applied) in a destination resolution (1090). A typical implementation involves a user in a home receiving a VCW picture and displaying the VCW picture on a TV or other video viewing device. The received VCW picture is already scaled to the destination resolution and already has motion blur applied.

The process 1000 can be used in a variety of applications. A few common applications are now briefly described.

In a first application, as mentioned earlier, a broadcast truck performs the process 1000 up through and including transmitting information in the operation 1080. The broadcast truck also, in certain of these applications, is able to create a different VCW on demand when, for example, a referee wishes to review a portion of the play that occurred at a different part of the field. The referee is able to select a different feature of interest to be tracked.

In a second application, the broadcast truck transmits pictures from several different VCWs that each track one or more different features of interest. In this way, the user (for example, at a home) can select which VCW to watch. For example, a first VCW can track the ball, and a second VCW can track the goalie that is nearest to the ball.

In a third application, a cable distribution head-end or hub receives the panoramic video (for example, from a broadcast truck or other content provider) and performs the operations 1020-1080, and provides (in the operation 1080) one or more VCWs to a user in a home. One advantage of having a cable hub perform much of the computation and processing is that the distribution channel to the cable hub often has a high bandwidth. The high bandwidth allows the panoramic video to be sent. However, the distribution channel to individual homes from the cable hub (sometimes referred to as the "last mile") is often much lower bandwidth and it is advantageous, therefore, to send only the VCW picture from the cable hub to the individual homes.

A variety of implementations are achieved by arranging the operations of the process 1000 in a different order. Several of those implementations are now described by referring simply to re-ordering (i) the transmit (1080) and receive (1085) operations and/or (ii) the scaling (1075) operation.

A first set of alternate implementations are achieved by moving the transmit operation 1080 and the receive operation 1085 to one or more of the following locations in the process 1000:

1. After capturing the panoramic video in the operation 1010: In such implementations, the entire panoramic video is typically transmitted and received. The rest of the process 1000 occurs, typically, at the receiver (or downstream from the receiver).
2. After determining the camera vector in the operation 1040: In such implementations, the VCW picture and the camera vector are typically transmitted and received. The rest of the process 1000 occurs, typically, at the receiver (or downstream from the receiver). One implication for various implementations is that the motion vectors are determined in the operation 1050 based on the VCW pictures and not on the panoramic video. The motion vectors that are thereby determined are, typically, going to include the motion of the camera. Therefore, there is typically no need to combine the motion vector for a feature with the camera vector to get a combined vector.

One exception is for features for which no motion can be determined precisely but for which it is clear that there is motion. An example is a textured background such as a grass field. It can be difficult to determine the exact motion associated with any particular portion of grass. However, for such features, it can often be determined that the feature is part of a static background. The feature (grass) motion can then be assumed to be zero. Accordingly, the combined vector can be taken to be the same as the camera vector. The combined vector is then used to determine the proper motion blur to apply to the feature (grass).
3. After determining the feature motion vector(s) in the operation 1050: In such implementations, the VCW picture, the camera vector, and the feature motion vector(s) are typically transmitted and received. The rest of the process 1000 occurs, typically, at the receiver (or downstream from the receiver). This implementation allows the receiver to do the processing required to combine the vectors, determine and apply the motion blur, and scale the result.
4. After combining the camera vector and the feature motion vector(s) in the operation 1060: In such implementations, the VCW picture, and the combined motion vector(s) for the feature(s) are typically transmitted and received. The rest of the process 1000 occurs, typically, at the receiver (or downstream from the receiver). This implementation allows the receiver to do the processing required to determine and apply the motion blur, as well as scale the result.
5. After determining the motion blur for a feature and applying the motion blur to the feature in the VCW picture in the operation 1070: In such implementations, the motion-blurred VCW picture is typically transmitted and received. The rest of the process 1000 occurs, typically, at the receiver (or downstream from the receiver). Such implementations can often provide higher quality for the user. Higher quality can be achieved if the system uses a video coding algorithm that is lossy, and if the losses that occur are less noticeable to a user when they occur on a higher resolution video (before scaling). That is, the information that is lost is not as important if you start with a higher quality video. However, if the video is scaled down (it is assumed that the scaling will be down-scaling, but some implementations use up-scaling) before applying a lossy compression scheme, then the information that is lost is often more important to a user's subjective viewing experience.

A second set of alternate implementations are achieved by moving the scale operation 1075 to a different location in the process 1000. Note that all of these variations can be combined with the above variations that also move the transmit and receive operations (1080, 1085). The scaling operation 1075 can be moved, for example, to one or more of a variety of locations in the process 1000. Such locations include, for example, (i) after forming the VCW picture (1030), (ii) after determining the camera vector (1040), (iii) after determining the motion vector(s) for one or more features of interest (1050), or (iv) after combining the camera vector and the feature vector(s) (1060). In such implementations, the vectors (either the camera vector and the feature vectors, or simply the combined vector) are typically scaled before determining and applying the motion blur (1070), so that the resolution of the combined vectors are in agreement with the resolution of the scaled VCW picture.

As should be clear from the discussion of various implementations, there are a number of options and variations available to a system designer that wants to implement a version of the process 1000. Several system metrics can be consulted by a system designer as criteria to use in determining what variation of the process 1000 to implement. Some of these metrics and their implications follow:

1. Bandwidth on various communication links: For example, panoramic pictures typically require high bandwidth, whereas a VCW picture typically requires a relatively lower bandwidth.
2. Quality required at final display: For example, performing the motion blur processing on a full resolution video typically provides higher final quality than performing the processing on a scaled-down resolution.
3. Processing power and speed at various points in the distribution chain: Some of the points in the distribution chain include, for example, the broadcaster or other content provider, a distribution head-end (for example, a cable head-end), a distribution hub, and an end user in a home. Regarding processing, a home system will not typically have the processing power and speed to perform the motion vector determination (using, for example, optical flow algorithms) or the motion blur determination and application.
4. End-user selection/control required: For example, if an end-user in a home is to be given the ability to freely select a feature of interest in a scheduled program, then the system will typically require more bandwidth because each home can be receiving a different VCW (and the associated stream of VCW pictures, also referred to as a VCW video) of the scheduled program.

These metrics also interrelate, as is shown, for example, in the following implementation:

1. For example, in one implementation, bandwidth is low from the cable hub to the end-user homes, so the system designer wants to transmit scaled-down video from the cable hub to the homes.
2. Additionally, high quality is desired, so the system designer wants to perform the motion analysis and motion blur before down-scaling (at the broadcaster, cable head-end, or cable hub).
3. Further, the end-users are given a lot of selection/control which can result in the cable hub sending multiple VCW videos at the same time. This requirement reinforces the system designer's choice to transmit scaled-down pictures from the cable hub to the homes. Additionally, to reduce the processing load on the broadcaster or the cable head-end, the system designer prefers to have the cable hub generate the selected VCW videos for those homes downstream from the hub.
4. However, if the processing speed and power is low at the cable hub, then the system designer may be forced to generate the VCW videos (for example, perform the motion analysis and motion blurring) at the cable head-end or broadcaster for all homes in the distribution system.

Figure 11:
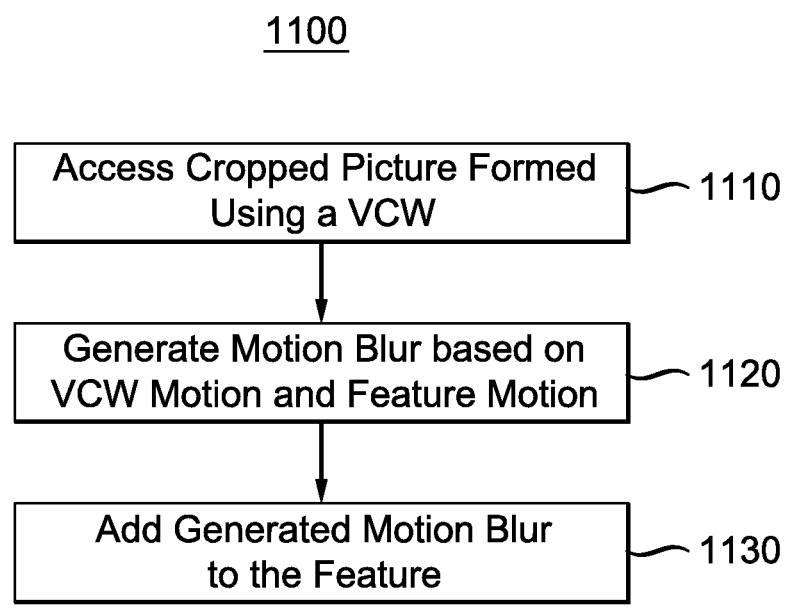
FIG. 11 provides a flow diagram depicting another example of a process for applying motion blur.

Referring to FIG. 11, a flow diagram is provided that depicts a process 1100 for applying motion blur. The process 1100 includes accessing a cropped picture that is formed using a VCW (1110). In at least one implementation, the operation 1110 includes accessing a cropped picture that has been cropped, using a virtual camera window, from a picture in a sequence of pictures. The operation 1110 includes, in certain implementations, accessing the VCW picture formed by the operation 1030 of the process 1000.

The process 1100 includes generating motion blur based on VCW motion and motion for a feature (1120). In at least one implementation, the operation 1120 includes generating motion blur for a feature in the cropped picture based on a motion of the virtual camera window and a motion of the feature.

The process 1100 includes adding the generated motion blur to the feature (1130). In at least one implementation, the operation 1130 includes adding the generated motion blur to the feature in the cropped picture. The operations 1120 and 1130 include, in certain implementations, determining motion blur for a feature of interest and applying that motion blur, as described in the operation 1070 of the process 1000.

Various implementations are achieved that involve adding additional features to the process 1100. Several variations of the process 1100 include one or more of the features in the following implementations.

In an implementation, the process 1100 is further defined such that: (i) the sequence of pictures are from a stationary position, (ii) the motion of the virtual camera window is determined with respect to the stationary position, and (iii) the motion of the feature is determined with respect to the stationary position.

In another implementation, the process 1100 is further defined such that: (i) the sequence of pictures further includes an earlier picture that occurs earlier in time than the picture, (ii) the earlier picture includes the feature, (iii) the virtual camera window has a position in the earlier picture such that the feature is within the virtual camera window, (iv) the motion of the virtual camera window is determined based on any change in position of the virtual camera window from the earlier picture to the picture, and (v) the motion of the feature is based on any change in position of the feature from the earlier picture to the picture.

In another implementation, the process 1100 is further defined such that: (i) the motion of the virtual camera window and the motion of the feature are determined as a combined motion, and (ii) the combined motion indicates a motion of the feature in the cropped picture with respect to another cropped picture that has been cropped, using the virtual camera window, from another picture in the sequence of pictures.

In another implementation, the process 1100 is further defined such that: the sequence of pictures are from a stationary position, and the process further includes determining, based on the cropped picture, that the feature is part of a background that is static with respect to the stationary position and assigning the motion of the feature to be zero.

In another implementation, the process 1100 is further defined to include: (i) accessing the picture, (ii) identifying the feature in the picture, (iii) generating the virtual camera window that includes the feature within the picture, and (iv) determining a combination motion for the feature that is a combination of the motion of the virtual camera window and the motion of the feature, wherein generating the motion blur comprises generating the motion blur based on the combination motion.

In another implementation, the process 1100 is further defined to include: (i) tracking the feature across multiple pictures in the sequence of pictures, and (ii) generating the virtual camera window in the multiple pictures based on the tracking.

In another implementation, the process 1100 is further defined such that identifying the feature includes using object recognition or facial recognition.

In another implementation, the process 1100 is further defined to include generating motion blur for a second feature in the cropped picture based on the motion of the virtual camera window and a motion of the second feature.

In another implementation, the process 1100 is further defined such that the cropped picture is a scaled picture that is scaled to a display resolution before generating the motion blur.

In another implementation, the process 1100 is further defined to include scaling the cropped picture to a display resolution after adding the generated motion blur to the feature in the cropped picture.

In another implementation, the process 1100 is further defined to include sending one or more of: (i) the cropped picture after adding the generated motion blur, (ii) the cropped picture before adding the generated motion blur, (iii) an indicator of the motion of the virtual camera window, or (iv) an indicator of the motion of the feature.

In another implementation, the process 1100 is further defined such that the picture is a composite picture that includes pictures taken from multiple cameras.

In another implementation, the process 1100 is further defined such that the picture is a single picture taken from a single camera.

In another implementation, the process 1100 is further defined such that the picture has no motion blur.

In another implementation, the process 1100 is further defined to include: (i) receiving an input identifying the feature as a feature of interest, and (ii) determining the virtual camera window based on the received input.

In another implementation, the process 1100 is further defined such that the accessing, the generating, and the adding are performed at a receiver, and the process 1100 further includes: (i) sending a signal from the receiver, the signal indicating that a second feature is a feature of interest, and (ii) receiving at the receiver, in response to sending the signal, a second cropped picture that has been cropped, using a second virtual camera window, from a second picture in the sequence of pictures, wherein the second virtual camera window is different from the virtual camera window.

In another implementation, the process 1000 is further defined such that (i) the picture is a panoramic picture, and (ii) the sequence of pictures is a sequence of panoramic pictures.

Figure 12:
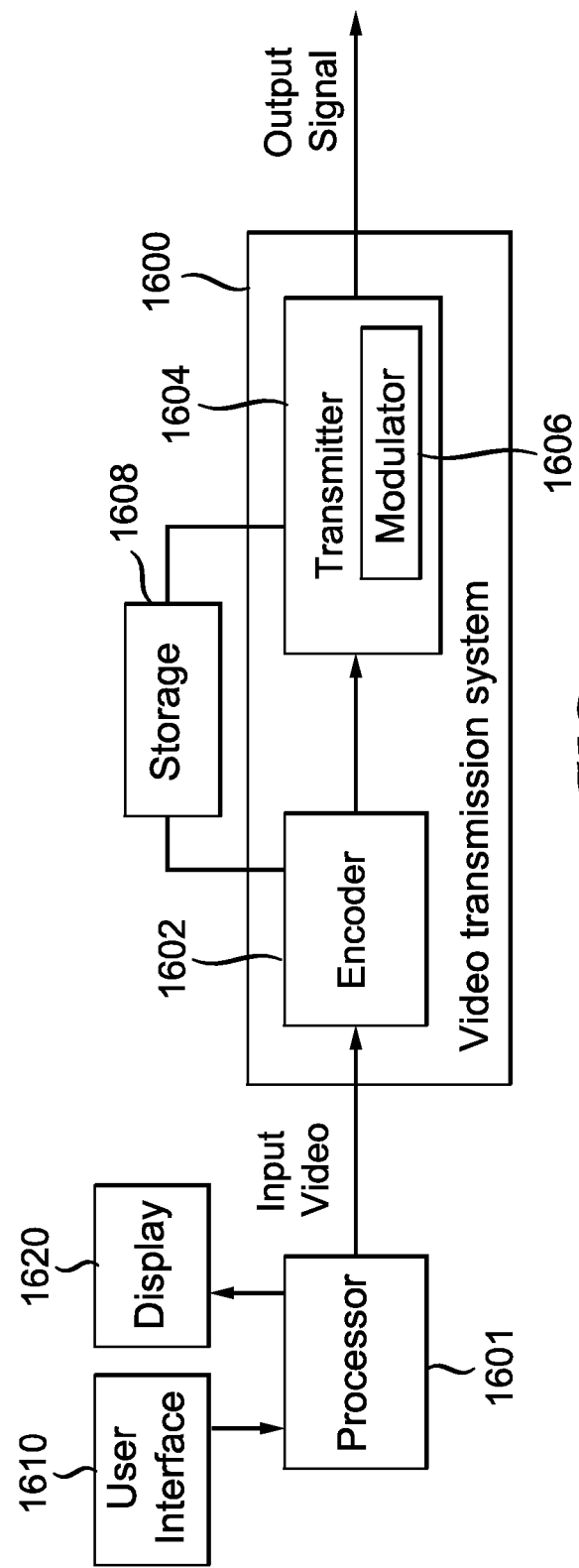
FIG. 12 provides a block diagram depicting an example of a transmission system for use in applying motion blur.

FIG. 12 provides a block diagram depicting an example of a transmission system for use in applying motion blur. Referring to FIG. 12, a video transmission system or apparatus 1600 is shown, to which the features and principles described above may be applied. The video transmission system or apparatus 1600 may be, for example, a head-end or transmission system for transmitting a signal using any of a variety of media, such as, for example, satellite, cable, telephone-line, or terrestrial broadcast. The video transmission system or apparatus 1600 also, or alternatively, may be used, for example, to provide a signal for storage. The transmission may be provided over the Internet or some other network. The video transmission system or apparatus 1600 is capable of generating and delivering, for example, video content and other content such as, for example, metadata. It should also be clear that the blocks of FIG. 12 provide a flow diagram of a video transmission process, in addition to providing a block diagram of a video transmission system or apparatus.

The video transmission system or apparatus 1600 receives input video from a processor 1601. In one implementation, the processor 1601 simply provides video images, such as images from a program, to the video transmission system or apparatus 1600. However, in another implementation, the processor 1601 alternatively, or additionally, provides content from other sources to the video transmission system or apparatus 1600. The processor 1601 may also provide metadata to the video transmission system or apparatus 1600, in which the metadata relates, for example, to one or more of the input images, and may include, for example, a description of encoding methods used to encode the data.

The video transmission system or apparatus 1600 includes an encoder 1602 and a transmitter 1604 capable of transmitting the encoded signal. The encoder 1602 receives video information from the processor 1601. The video information may include, for example, video images, and/or other content. The encoder 1602 generates an encoded signal(s) based on the video and/or other information. The encoder 1602 is, in various implementations, a source encoder, a channel encoder, or a combination of a source encoder and a channel encoder. In various implementations, the encoder 1602 is, for example, an AVC encoder (defined elsewhere in this application).

The encoder 1602 may include sub-modules, including for example an assembly unit for receiving and assembling various pieces of information into a structured format for storage or transmission. The various pieces of information may include, for example, encoded or unencoded video, other content, metadata or information, and various elements such as, for example, motion vectors, coding mode indicators, and syntax elements. In some implementations, the encoder 1602 includes the processor 1601 and therefore performs the operations of the processor 1601.

The transmitter 1604 receives the encoded signal(s) from the encoder 1602 and transmits the encoded signal(s) in one or more output signals. The transmitter 1604 may be, for example, adapted to transmit a program signal having one or more bitstreams representing encoded pictures and/or information related thereto. Typical transmitters perform functions such as, for example, one or more of providing error-correction coding (which may alternatively, or additionally, be performed in the encoder 1602), interleaving the data in the signal (which may alternatively, or additionally, be performed in the encoder 1602), randomizing the energy in the signal, and modulating the signal onto one or more carriers using a modulator 1606. The transmitter 1604 may include, or interface with, an antenna (not shown). Further, implementations of the transmitter 1604 may be limited to the modulator 1606.

The video transmission system or apparatus 1600 is also communicatively coupled to a storage unit 1608. In one implementation, the storage unit 1608 is coupled to the encoder 1602, and the storage unit 1608 stores an encoded bitstream from the encoder 1602 and, optionally, provides the stored bitstream to the transmitter 1604. In another implementation, the storage unit 1608 is coupled to the transmitter 1604, and stores a bitstream from the transmitter 1604. The bitstream from the transmitter 1604 may include, for example, one or more encoded bitstreams that have been further processed by the transmitter 1604. The storage unit 1608 is, in different implementations, one or more of a standard DVD, a Blu-Ray disc, a hard drive, or some other storage device.

FIG. 12 also includes a user interface 1610 and a display 1620, both of which are communicatively coupled to the processor 1601. The processor 1601 is communicatively coupled to the user interface 1610 for accepting input from, for example, an operator. The processor 1601 is communicatively coupled to the display 1620 for displaying, for example, digital pictures. Pictures are displayed, in various implementations, before, during, and/or after being processed by the processor 1601.

The display 1620 also includes, in various implementations, the user interface 1610. One implementation uses a touch screen for both the user interface 1610 and the display 1620.

Figure 13:
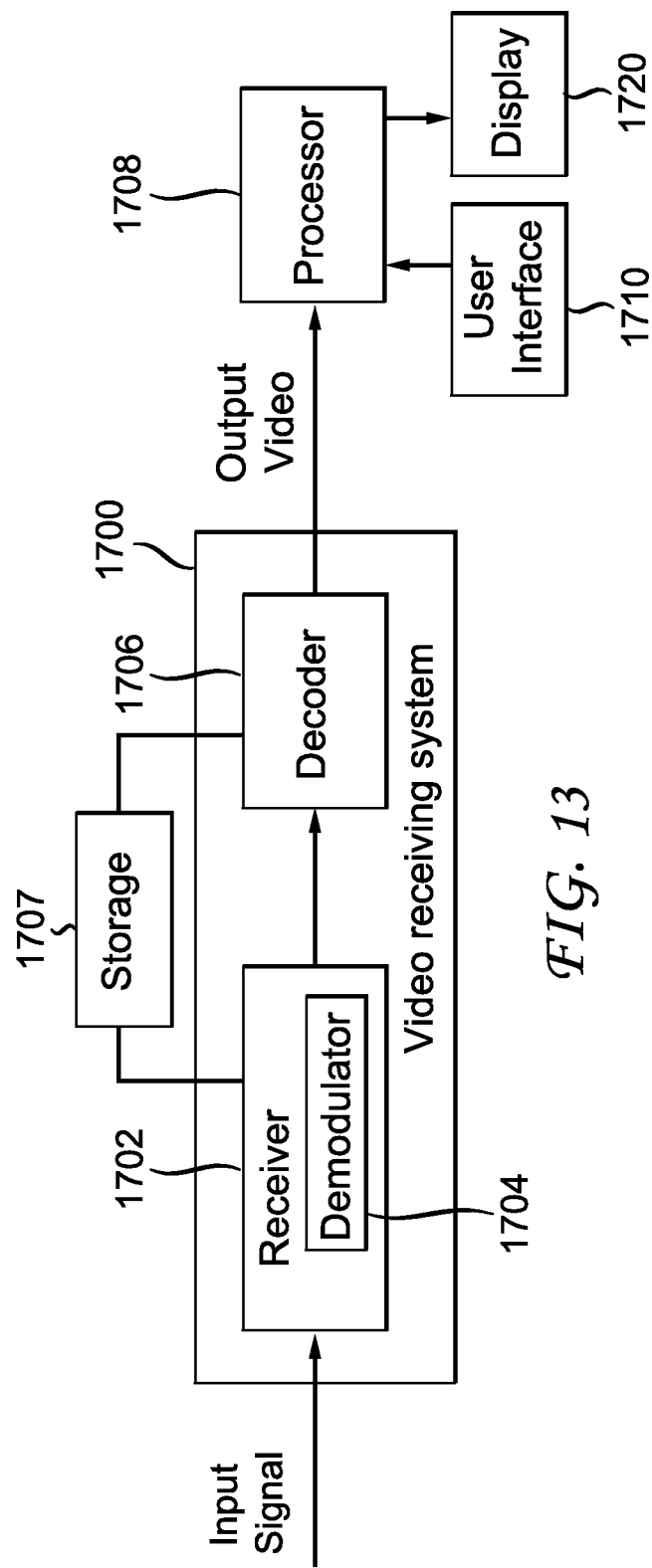
FIG. 13 provides a block diagram depicting an example of a receiving system for use in applying motion blur.

FIG. 13 provides a block diagram depicting an example of a receiving system for use in applying motion blur. Referring to FIG. 13, a video receiving system or apparatus 1700 is shown to which the features and principles described above may be applied. The video receiving system or apparatus 1700 may be configured to receive signals over a variety of media, such as, for example, satellite, cable, telephone-line, or terrestrial broadcast. The signals may be received over the Internet or some other network. It should also be clear that the blocks of FIG. 17 provide a flow diagram of a video receiving process, in addition to providing a block diagram of a video receiving system or apparatus.

The video receiving system or apparatus 1700 may include, for example, a cell-phone, a computer, a tablet, a router, a gateway, a set-top box, a television, or other device that receives encoded video and provides, for example, decoded video signal for display (display to a user, for example), for processing, or for storage. Thus, the video receiving system or apparatus 1700 may provide its output to, for example, a screen of a television, a screen of a cell phone, a screen of a tablet, a computer monitor, a computer (for storage, processing, or display), or some other storage, processing, or display device.

The video receiving system or apparatus 1700 is capable of receiving and processing video information. The video information may include, for example, video images, other content, and/or metadata. The video receiving system or apparatus 1700 includes a receiver 1702 for receiving an encoded signal, such as, for example, the signals described in the implementations of this application. The receiver 1702 may receive, for example, (i) a signal providing encoded layers for a sequence of pictures in a program, or (ii) a signal output from the video transmission system 1600 (for example, from the storage unit 1608 or the transmitter 1604) of FIG. 12.

The receiver 1702 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 1704, de-randomizing the energy in the signal, de-interleaving the data in the signal (which may alternatively, or additionally, be performed in a decoder), and error-correction decoding the signal (which may alternatively, or additionally, be performed in a decoder). The receiver 1702 may include, or interface with, an antenna (not shown). Implementations of the receiver 1702 may be limited to the demodulator 1704.

The video receiving system or apparatus 1700 includes a decoder 1706. The decoder 1706 is, in various implementations, a source decoder, a channel decoder, or a combination of a source decoder and a channel decoder. In one implementation, the decoder 1706 includes the channel decoder 155 and the source decoder 160 of FIG. 1.

The receiver 1702 provides a received signal to the decoder 1706. The signal provided to the decoder 1706 by the receiver 1702 may include one or more encoded bitstreams. The decoder 1706 outputs a decoded signal, such as, for example, decoded video signals including video information, other content, or metadata. The decoder 1706 may be, for example, an AVC decoder (defined elsewhere in this application).

The video receiving system or apparatus 1700 is also communicatively coupled to a storage unit 1707. In one implementation, the storage unit 1707 is coupled to the receiver 1702, and the receiver 1702 accesses a bitstream from the storage unit 1707 and/or stores a received bitstream to the storage unit 1707. In another implementation, the storage unit 1707 is coupled to the decoder 1706, and the decoder 1706 accesses a bitstream from the storage unit 1707 and/or stores a decoded bitstream to the storage unit 1707. The bitstream accessed from the storage unit 1707 includes, in different implementations, one or more encoded bitstreams. The storage unit 1707 is, in different implementations, one or more of a standard DVD, a Blu-Ray disc, a hard drive, or some other storage device.

The output video from the decoder 1706 is provided, in one implementation, to a processor 1708. The processor 1708 is, in one implementation, a processor configured for presenting decoded digital pictures. In some implementations, the decoder 1706 includes the processor 1708 and therefore performs the operations of the processor 1708. In other implementations, the processor 1708 is part of a downstream device such as, for example, a set-top box or a television.

FIG. 12 also includes a user interface 1710 and a display 1720, both of which are communicatively coupled to the processor 1708. The processor 1708 is communicatively coupled to the user interface 1710 for accepting input from, for example, a user at a home or an operator at a cable hub. The processor 1708 is communicatively coupled to the display 1720 for displaying, for example, digital pictures. Pictures are displayed, in various implementations, before, during, and/or after being processed by the processor 1708.

The display 1720 also includes, in various implementations, the user interface 1710. One implementation uses a touch screen for both the user interface 1710 and the display 1720. Yet further implementations include the user interface 1710 and/or the display 1720 in the video receiving system 1700.

FIGS. 12-13 can be used, in various implementations, to perform all or part of the process 1000 or the process 1100, as well as any of the additional features described with respect to the processes 1000 or 1100. Several such implementations follow.

In an implementation, the processor 1601, in conjunction with the user interface 1610 and the display 1620, is used to perform the operations 1020-1075. The transmitter 1604 is used to perform the operation 1080. The receiver 1702 is used to perform the operation 1085. The processor 1708, in conjunction with the user interface 1710 and the display 1720, is used to perform the operation 1090.

In another implementation, the processor 1601, in conjunction with the user interface 1610 and the display 1620, is used to perform the operations 1110-1130.

In another implementation, the processor 1708, in conjunction with the user interface 1710 and the display 1720, is used to perform the operations 1110-1130.

Components from FIGS. 12-13 can be selectively combined to form other implementations. In one implementation, a cable hub includes the components of FIG. 13 followed by the video transmission system 1600 (possibly including the storage device 1608). In such an implementation, the cable hub is able, for example, to use the video receiving system 1700 to receive a panoramic video from a broadcaster, cable head-end, or other content provider. The cable hub is then able to use the processor 1706, the user interface 1710, and the display 1720 to perform, for example, the operations 1020-1075 of the process 1000 (these operations 1020-1075 could also be performed automatically). The cable hub is then able to provide, for example, the resulting video (and possibly other information) from the operation 1075 to the video transmission system 1600, which performs, for example, the operation 1080 of the process 1000.

Various implementations provide a signal. In one implementation, the transmitter 1604 provides, as all or part of performing the operation 1080 of the process 1000, a signal that includes a picture section and a motion section. The picture section is for a cropped picture that has been cropped, using a virtual camera window, from a picture in a sequence of pictures. The motion section is for an indication of a motion of the virtual camera window. The picture section and the motion are included, in various implementations, in a signal structure. In several such implementations, the signal structure is stored on a processor readable medium.

The display 1620 and/or the display 1720 includes, in various implementations, one or more of a computer display, a laptop display, a tablet display, a cell phone display, a television display, or any of the other displays mentioned in this application or known in the art, including projected displays that may be visible on any surface, such as, for example, a wall, a ceiling, a floor, or a sidewalk.

The user interface 1610 and/or the user interface 1710 includes, in various implementations, one or more of a mouse, a track pad, a keyboard, a touch screen, a microphone for accepting voice commands that are interpreted by the processor 1601 and/or the processor 1708, a remote control, a cell phone, a separate computer whether remote or local, or any other input device mentioned in this application or known in the art.

The storage device 1608 and/or the storage device 1707 includes, in various implementations, any of the storage devices mentioned in this application or known in the art.

The encoder 1602 includes, in various implementations, an AVC or H.264 encoder (defined elsewhere in this application), an encoder for any other standard, or any other encoding device mentioned in this application or known in the art.

The transmitter 1604 includes, in various implementations, an output pin of any integrated circuit, a Universal Asynchronous Receiver/Transmitter (UART), a broadcast transmitter, a satellite transmitter, a cable transmitter, or any other transmitting device mentioned in this application or known in the art. The transmitter 1604 may be, for example, adapted to transmit a program signal having one or more bitstreams representing encoded pictures and/or information related thereto. Typical transmitters perform functions such as, for example, one or more of providing error-correction coding (which may alternatively, or additionally, be performed in the encoder 1602), interleaving the data in the signal (which may alternatively, or additionally, be performed in the encoder 1602), randomizing the energy in the signal, and modulating the signal onto one or more carriers using a modulator. The transmitter 1604 may include, or interface with, an antenna (not shown). Further, implementations of the transmitter 1604 may be limited to a modulator.

This application provides multiple figures, including the pictorial diagrams of FIGS. 1-9, the flow diagrams of FIGS. 10-11, and the block diagrams of FIGS. 12-13. Each of these figures provides disclosure for a variety of implementations, as explained briefly for the following examples.

As a first example, we note that the pictorial diagrams of FIGS. 1-9, at least in part, certainly describe output screens shown to a user or illustrate various concepts. However, it should also be clear that the pictorial diagrams describe one or more process flows. For example, at least FIGS. 1-2 and 5-6 also describe a process of determining an initial motion vector for an object. Further, at least FIGS. 3 and 8-9 also describe a process of determining a combined motion vector for an object.

As a second example, we note that the flow diagrams certainly describe a flow process. However, it should also be clear that the flow diagrams provide an interconnection between functional blocks of a system or apparatus for performing the flow process. As an example, FIG. 11 also presents a block diagram for performing the functions of the process 1100. For example, (i) reference element 1110 also represents a block for performing the function of accessing a cropped picture, (ii) reference element 1120 represents a block for performing the function of generating motion blur, and (iii) the interconnection between elements 1110 and 1120 represents a coupling between a component for accessing a cropped picture and a component for generating motion blur. Other blocks of FIG. 11 are similarly interpreted in describing this system/apparatus.

As a third example, we note that the block diagrams certainly describe an interconnection of functional blocks of an apparatus or system. However, it should also be clear that the block diagrams provide a description of various process flows. As an example, FIG. 12 also presents a flow diagram for performing various processes that include the functions of the blocks of FIG. 12. For example, (i) the block for the encoder 1602 also represents the operation of encoding pictures, (ii) the block for the transmitter 1604 also represents the operation of transmitting pictures, and (iii) the interconnection between the encoder 1602 and the transmitter 1604 represents a process in which pictures are encoded and then transmitted. Other blocks of FIG. 12 are similarly interpreted in describing this flow process.

We have thus provided a number of implementations. It should be noted that variations of the described implementations, as well as additional applications, are contemplated and are considered to be within our disclosure. Additionally, features and aspects of described implementations may be adapted for other implementations.

Various implementations are described with respect to panoramic pictures. However, such implementations can be adapted for use with pictures that are not panoramic pictures. It should be clear, for example, that a VCW can be constructed for a picture that is not a panoramic picture.

Several of the implementations refer to features that are automated or that are performed automatically. Variations of such implementations, however, are not automated and/or do not perform all of part of the features automatically.

Additionally, several implementations refer to determining a combined motion vector for a feature, based on two separate motions (a camera motion and an independent feature motion). In various implementations, however, the combined motion vector is determined based on more than two component vectors.

Several of the implementations and features described in this application may be used in the context of the AVC Standard, and/or AVC with the MVC (Multiview Video Coding) extension (Annex H), and/or AVC with the SVC (Scalable Video Coding) extension (Annex G). Additionally, these implementations and features may be used in the context of another standard (existing or future), or in a context that does not involve a standard. Note that AVC refers to the existing International Organization for Standardization/International Electrotechnical Commission ("ISO/IEC") Moving Picture Experts Group-4 ("MPEG-4") Part 10 Advanced Video Coding ("AVC") standard/International Telecommunication Union, Telecommunication Sector ("ITU-T") H.264 Recommendation (variously referred to throughout this document as the "H.264/MPEG-4 AVC Standard" or variations thereof, such as the "AVC standard", the "H.264 standard", or simply "AVC" or "H.264").

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

Further, many implementations may refer to a "frame". However, such implementations are assumed to be equally applicable to a "picture" or "image".

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

This application refers to "encoders" and "decoders" in a variety of implementations. It should be clear that an encoder can include, for example, one or more (or no) source encoders and/or one or more (or no) channel encoders, as well as one or more (or no) modulators. Similarly, it should be clear that a decoder can include, for example, one or more (or no) modulators as well as one or more (or no) channel encoders and/or one or more (or no) source encoders.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in a processor, such as, for example, a post-processor or a pre-processor. The processors discussed in this application do, in various implementations, include multiple processors (sub-processors) that are collectively configured to perform, for example, a process, a function, or an operation. For example, the processors 1601 and 1708, as well as other processing components such as, for example, the encoder 1602, the transmitter 1604, the receiver 1702, and the decoder 1706, are, in various implementations, composed of multiple sub-processors that are collectively configured to perform the operations of that component.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants ("PDAs"), and other devices that facilitate communication of information between end-users.

Implementations of the various processes and features described herein may be embodied in a variety of different equipment or applications. Examples of such equipment include an encoder, a decoder, a post-processor, a pre-processor, a video coder, a video decoder, a video codec, a web server, a television, a set-top box, a router, a gateway, a modem, a laptop, a personal computer, a tablet, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc, or a Blu-Ray disc), a random access memory ("RAM"), a read-only memory ("ROM"), a USB thumb drive, or some other storage device. The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading syntax, or to carry as data the actual syntax-values generated using the syntax rules. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   capturing a panoramic sequence of pictures at a first resolution;
   accessing a cropped picture that has been cropped, using a virtual camera window, from a picture in the sequence of pictures;
   generating motion blur for a feature in the cropped picture based on a motion of the virtual camera window and a motion of the feature, wherein the first resolution is maintained during the generating;
   adding the generated motion blur to the feature in the cropped picture; and
   downscaling the cropped picture for a destination resolution after adding the generated motion blur.

2. The method of claim 1 wherein:
   the sequence of pictures are from a stationary position,
   the motion of the virtual camera window is determined with respect to the stationary position, and
   the motion of the feature is determined with respect to the stationary position.

3. The method of claim 1 wherein:
   the sequence of pictures further includes an earlier picture that occurs earlier in time than the picture,
   the earlier picture includes the feature,
   the virtual camera window has a position in the earlier picture such that the feature is within the virtual camera window, the motion of the virtual camera window is determined based on any change in position of the virtual camera window from the earlier picture to the picture, and the motion of the feature is based on any change in position of the feature from the earlier picture to the picture.

4. The method of claim 1 wherein:

the motion of the virtual camera window and the motion of the feature are determined as a combined motion, the combined motion indicates a motion of the feature in the cropped picture with respect to another cropped picture that has been cropped, using the virtual camera window, from another picture in the sequence of pictures.

5. The method of claim 1 wherein:

the sequence of pictures are from a stationary position, and the method further comprises determining, based on the cropped picture, that the feature is part of a background that is static with respect to the stationary position and assigning the motion of the feature to be zero.

6. The method of claim 1 further comprising:

accessing the picture;

identifying the feature in the picture;

generating the virtual camera window that includes the feature within the picture; and determining a combination motion for the feature that is a combination of the motion of the virtual camera window and the motion of the feature, wherein generating the motion blur comprises generating the motion blur based on the combination motion.

7. The method of claim 6 wherein identifying the feature comprises using object recognition or facial recognition.

8. The method of claim 1 further comprising:

tracking the feature across multiple pictures in the sequence of pictures; and generating the virtual camera window in the multiple pictures based on the tracking.

9. The method of claim 1 further comprising:

generating motion blur for a second feature in the cropped picture based on the motion of the virtual camera window and a motion of the second feature.

10. The method of claim 1 further comprising sending one or more of:

the cropped picture after adding the generated motion blur, the cropped picture before adding the generated motion blur, an indicator of the motion of the virtual camera window, or an indicator of the motion of the feature.

11. The method of claim 1 wherein the picture is a composite picture that includes pictures taken from multiple cameras.

12. An apparatus comprising:

a storage for capturing a panoramic sequence of pictures at a first resolution;

a receiver that accesses a cropped picture that has been cropped, using a virtual camera window, from a picture in the sequence of pictures;

a processor that (i) generates motion blur for a feature in the cropped picture based on a motion of the virtual camera window and a motion of the feature, and (ii) adds the generated motion blur to the feature in the cropped picture; and an encoder that downscales the cropped picture for a destination resolution.

13. The apparatus of claim 12 wherein:

the sequence of pictures are from a stationary position, the motion of the virtual camera window is determined with respect to the stationary position, and the motion of the feature is determined with respect to the stationary position.

14. The apparatus of claim 12 wherein:

the sequence of pictures further includes an earlier picture that occurs earlier in time than the picture, the earlier picture includes the feature, the virtual camera window has a position in the earlier picture such that the feature is within the virtual camera window, the motion of the virtual camera window is determined based on any change in position of the virtual camera window from the earlier picture to the picture, and the motion of the feature is based on any change in position of the feature from the earlier picture to the picture.

15. The apparatus of claim 12 wherein:

the motion of the virtual camera window and the motion of the feature are determined as a combined motion, the combined motion indicates a motion of the feature in the cropped picture with respect to another cropped picture that has been cropped, using the virtual camera window, from another picture in the sequence of pictures.

16. The apparatus of claim 12 wherein:

the sequence of pictures are from a stationary position, and (iii) determining, based on the cropped picture, that the feature is part of a background that is static with respect to the stationary position and assigning the motion of the feature to be zero.

17. The apparatus of claim 12 wherein:

the processor accesses the picture, identifies the feature in the picture, generates the virtual camera window that includes the feature within the picture, and determines a combination motion for the feature that is a combination of the motion of the virtual camera window and the motion of the feature, wherein generating the motion blur comprises generating the motion blur based on the combination motion.

18. The apparatus claim 12 wherein:

the processor tracks the feature across multiple pictures in the sequence of pictures and generates the virtual camera window in the multiple pictures based on the tracking.

19. The apparatus of claim 12 wherein the processor identifies the feature using object recognition or facial recognition.

20. The apparatus of claim 12 wherein:

the processor generates motion blur for a second feature in the cropped picture based on the motion of the virtual camera window and a motion of the second feature.

21. The apparatus of claim 12 further comprising a video transmission system for sending one or more of:

the cropped picture after adding the generated motion blur, the cropped picture before adding the generated motion blur, an indicator of the motion of the virtual camera window, or an indicator of the motion of the feature.

22. The apparatus of claim 12 wherein the picture is a composite picture that includes pictures taken from multiple cameras.

* * * * *